United States Patent [19]
Kita et al.

[11] Patent Number: 5,135,344
[45] Date of Patent: Aug. 4, 1992

[54] AUTOMATIC STORAGE/RETRIEVAL APPARATUS FOR ARTICLES

[75] Inventors: Hiroshi Kita; Shigeki Tsuchida; Tetsuji Hamada, all of Osaka, Japan

[73] Assignee: Kabushikkaisha Itoki Kosakusho, Osaka, Japan

[21] Appl. No.: 588,876

[22] Filed: Sep. 27, 1990

Related U.S. Application Data

[62] Division of Ser. No. 249,175, Aug. 15, 1988, Pat. No. 5,002,449.

[30] Foreign Application Priority Data

| Dec. 25, 1986 [JP] | Japan | 61-310955 |
| May 1, 1987 [JP] | Japan | 62-109583 |
| Jul. 28, 1987 [JP] | Japan | 62-115745[U] |
| Dec. 21, 1987 [JP] | Japan | 61-31097 |

[51] Int. Cl.$^5$ ............................................. B65G 1/00
[52] U.S. Cl. ................................... 414/273; 414/279; 414/280
[58] Field of Search ............ 414/273, 277, 279, 280, 414/281, 331, 661, 269, 270, 286, 660, 274; 198/435, 604, 626, 801

[56] References Cited

U.S. PATENT DOCUMENTS

| 2,626,040 | 1/1953 | Lamb | 198/801 X |
| 3,547,282 | 12/1970 | Hartbauer et al. | 414/286 X |
| 3,622,020 | 11/1971 | Sarvary | 414/279 |
| 3,817,406 | 6/1974 | Sawada et al. | 414/273 X |
| 3,880,299 | 4/1975 | Zollinger et al. | 414/273 |
| 4,466,765 | 8/1984 | Mautino | 414/277 |
| 4,492,504 | 1/1985 | Hainsworth | 414/273 |
| 4,579,499 | 4/1986 | Mikes | 414/273 |
| 4,690,602 | 9/1987 | Castaldi et al. | 414/280 X |
| 4,691,385 | 9/1987 | Tupman | 455/601 |
| 4,792,273 | 12/1988 | Specht | 414/273 X |
| 4,909,697 | 3/1990 | Bernard, II et al. | 414/660 X |

FOREIGN PATENT DOCUMENTS

| 0111975 | 9/1978 | Japan . | |
| 0043107 | 4/1981 | Japan | 414/269 |
| 0007703 | 1/1982 | Japan . | |
| 0144002 | 8/1983 | Japan | 414/273 |
| 0047707 | 4/1985 | Japan . | |
| 0009847 | 1/1987 | Japan | 414/280 |
| 0185604 | 8/1987 | Japan | 414/273 |

Primary Examiner—Robert J. Spar
Assistant Examiner—James Keenan
Attorney, Agent, or Firm—Lowe, Price, Le Blanc & Becker

[57] ABSTRACT

Inner pickers (6) are provided for respective stages of racks (4) of storage areas (2, 3) to be movable on rails (7). Operations of the inner pickers (6) are independently controlled in the respective rack stages by optical communication through optical communication units (9).

5 Claims, 13 Drawing Sheets

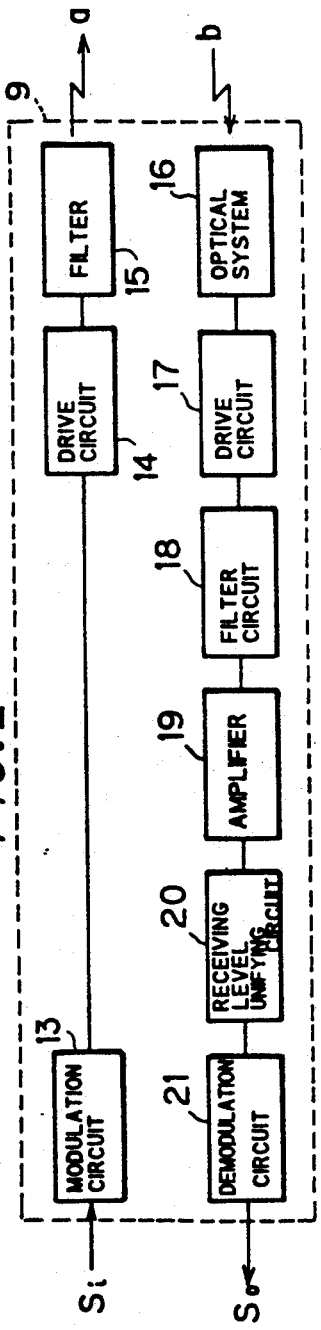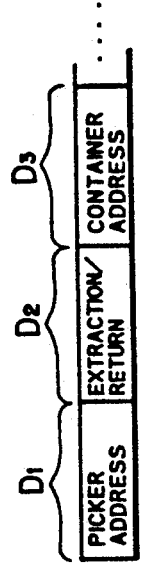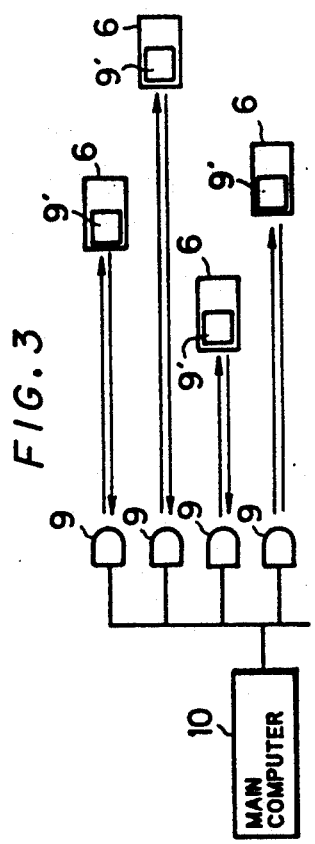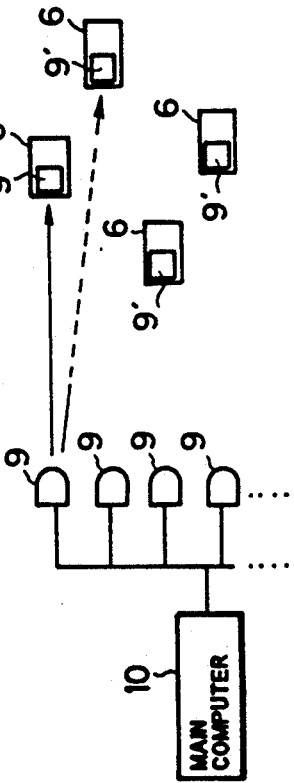

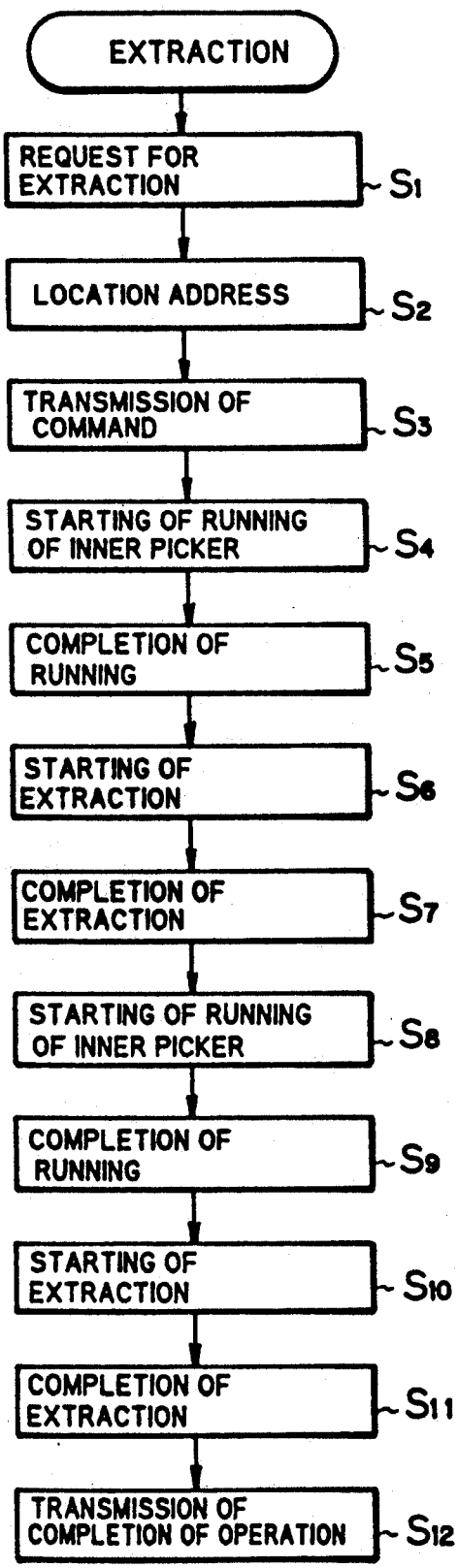

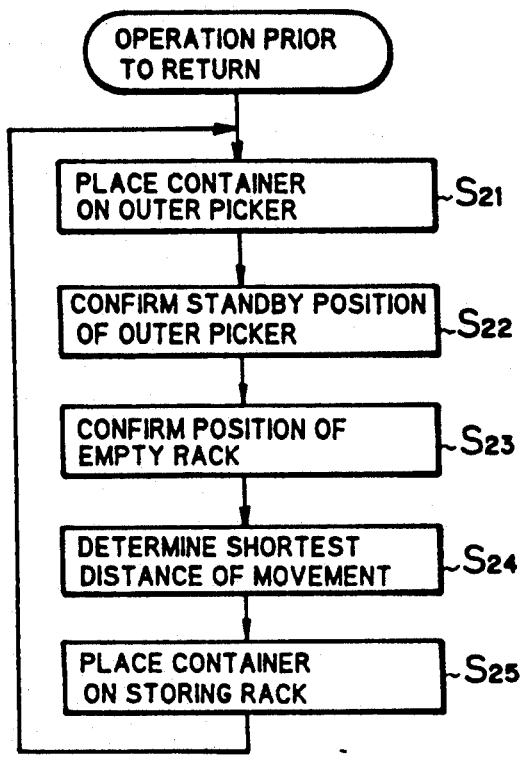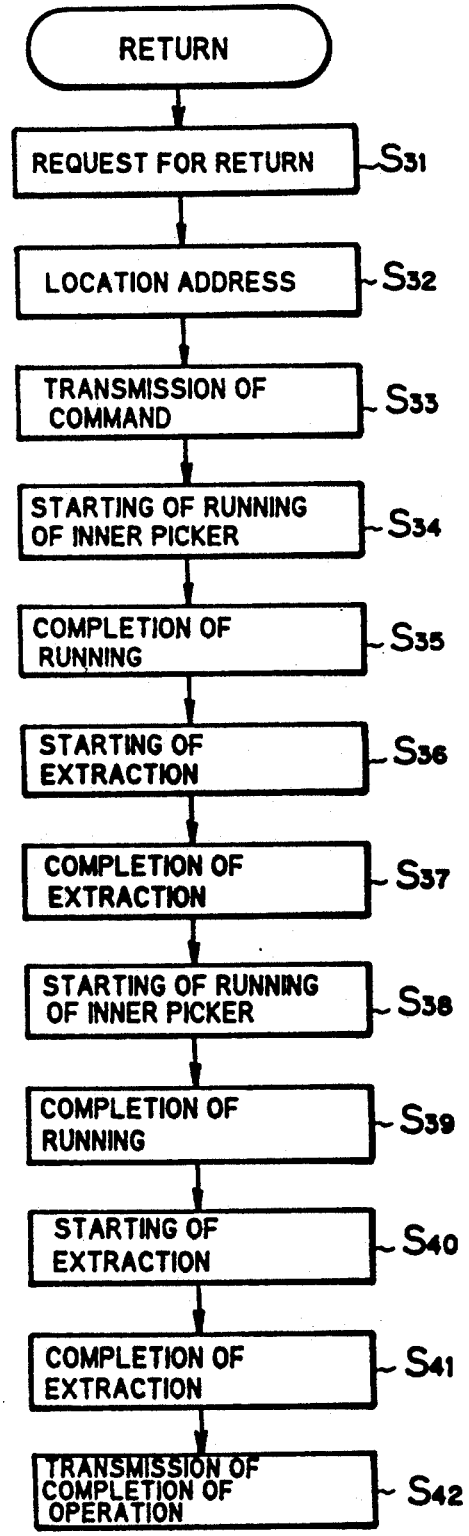

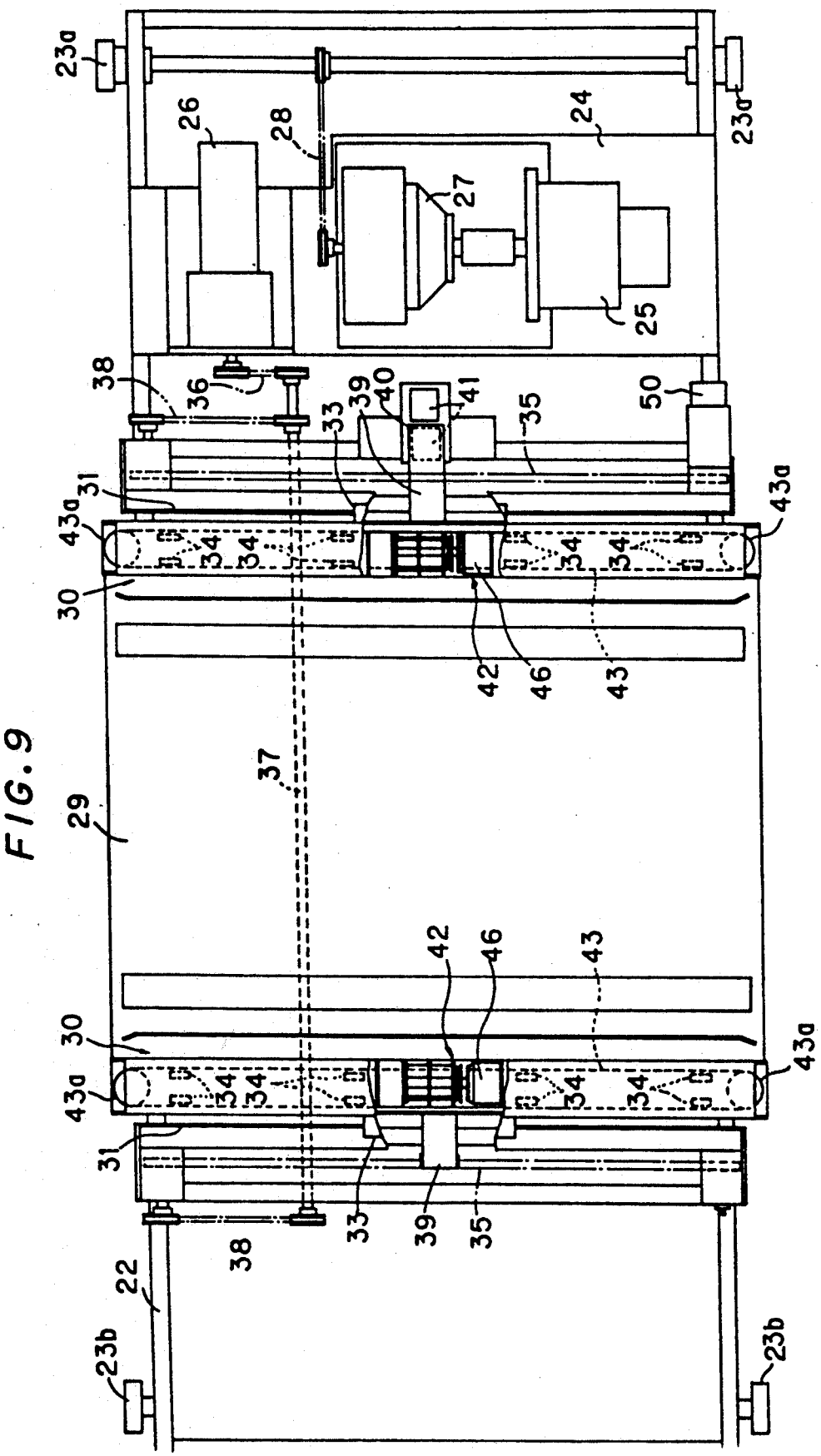

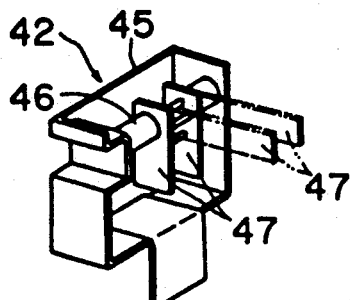
FIG. 13
FIG. 14
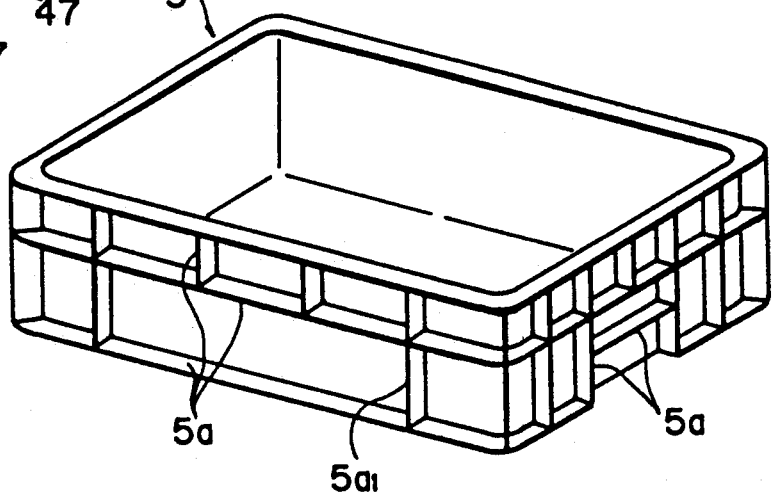
FIG. 15
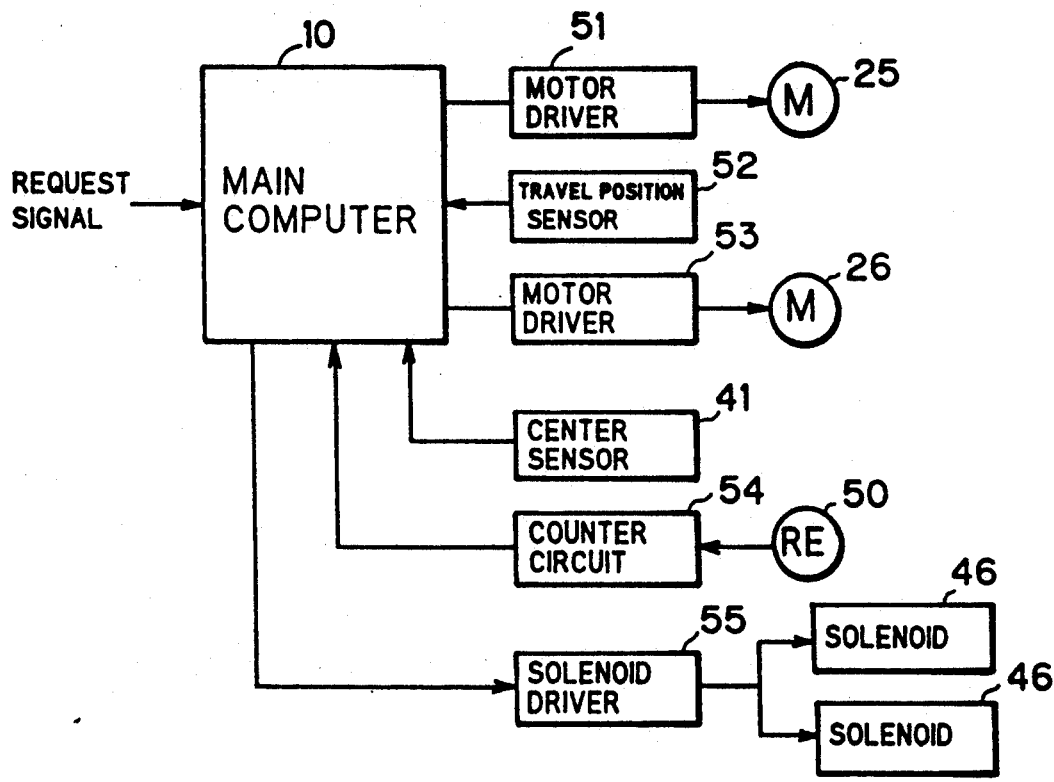

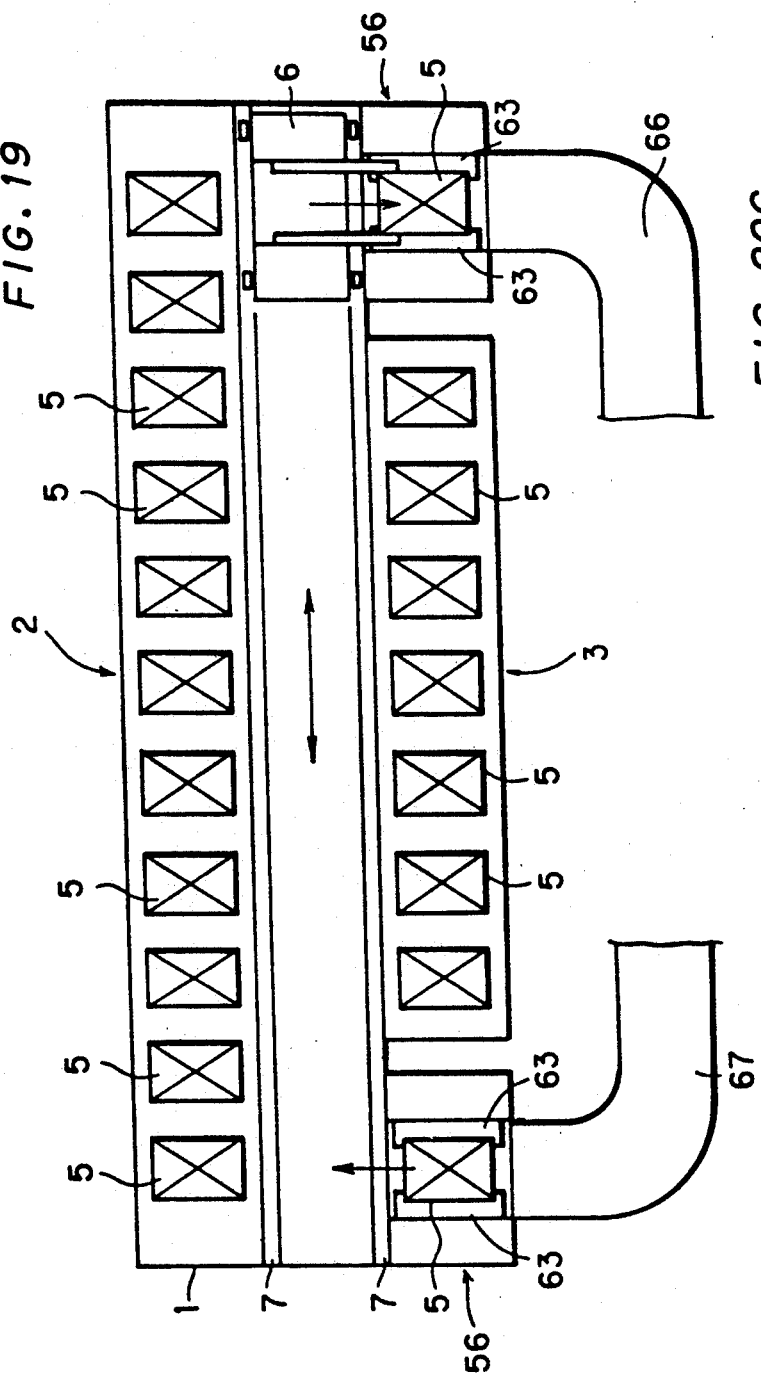
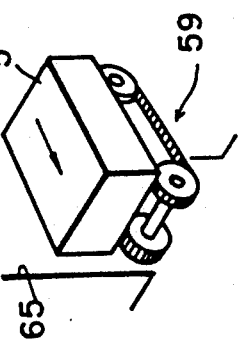
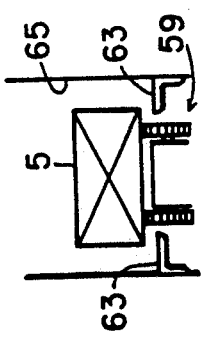
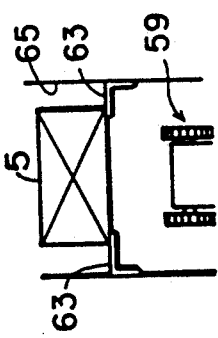

AUTOMATIC STORAGE/RETRIEVAL APPARATUS FOR ARTICLES

This is a division of U.S. application Ser. No. 07/249,175, filed on Aug. 15, 1988, which issued as U.S. Pat. No. 5,002,449.

TECHNICAL FIELD OF THE INVENTION

The present invention relates to an automatic storage/retrieval apparatus which can automatically perform storage and retrieval of articles in a storehouse or the like.

BACKGROUND OF THE INVENTION

In a conventional automatic storage/retrieval apparatus, two storage areas, which are formed by vertically and horizontally arranging racks serving as article storage places in the form of a matrix, are so provided that front surfaces thereof are opposed to each other with a prescribed space. A vertical column is moved along the front surfaces of the storage areas, to introduce/extract articles into/from respective racks of the storage areas by a picker vertically movably provided on the column.

In the aforementioned structure of the prior art, however, a vertically extended large column must be driven in order to move the pickers to a desired rack, whereby considerable power is required, causing increased operating cost. Further, since subsequent introducing/extracting operations cannot be performed until an article is completely introduced into/extracted from a desired rack, introducing/extracting processing takes much time in an inefficient manner. Further, the column and the picker must be connected with a control device for controlling the same by control wires, and hence wiring processing in installation is troublesome.

In the aforementioned conventional automatic storage/retrieval apparatus, further, a fork lift mechanism for picking up a container from the lower side of the container or an extracting arm mechanism formed to be engageable with a fitting portion provided on the front surface of the container has been employed as a mechanism of the picker for extracting the container, for receiving the article, from the storage area onto the picker and returning the same from the picker into the storage area. However, the fork lift mechanism is disadvantageous in space since the containers must be arranged with sufficient intervals in the vertical direction, while the extracting arm mechanism is applicable only to specific containers having the fitting portion on the front surface.

An automatic storage/retrieval apparatus such as that disclosed in Japanese Utility Model Laying-Open Gazette No. 60-64912 has been proposed. In this apparatus, racks of a storage area are circulated in the horizontal direction by endless chains independently for respective rack stages while a device for elevationally transferring an article is vertically provided in the middle of the path for the horizontal circulation movement so that a desired article can be taken out from the rack into the device or put in the rack from the device when the rack of each rack stage is stopped in a position opposite to the device.

In this apparatus, efficiency is improved since operation for introducing/extracting the articles can be performed independently for each rack stage, while considerable power is required at increased operating costs since the entire racks of each rack stage must be circulated simultaneously. Further, a pusher for pushing the article into the device from the rack or from the device into the rack must be provided for the respective rack stages without obstructing the circulation movement of the racks, so that the structure becomes complicated.

SUMMARY OF THE INVENTION

The present invention has been proposed to solve the aforementioned problems of the prior art, and its object is to provide an automatic storage/retrieval apparatus for articles which can save power required for operation, efficiently perform operations for introducing and extracting the articles and simplify wiring processing in installation, while preferably having sliding arms of simple structure engageable with a general container in side portions thereof, a simplified driving mechanism for the sliding arms and a simplified control system for the driving mechanism.

In order to attain the aforementioned object, according to the present invention, an automatic storage/retrieval apparatus for articles comprises a storage area formed by vertically and horizontally arranging a plurality of racks in the form of a matrix, pickers movably provided along opening sides of the racks for respective rack stages of the storage area for performing insertion/extraction of articles into/from the racks, first optical communication units provided to face the pickers for the respective rack stages toward a travel space of the pickers, second optical communication units provided on respective ones of the pickers to perform optical communication with corresponding ones of the first optical communication units and picker control means for transferring optical signals between the first and second optical communication units to independently control the pickers.

According to the aforementioned structure, the pickers can be independently driven in the respective rack stages by optical communication, whereby power consumption is small and operating efficiency for insertion/extraction of the articles is excellent while wiring is simplified.

In a preferred embodiment of the present invention, containers having engaging portions on their side walls are employed as articles. Each picker is provided with a pair of sliding arms reciprocally driven toward both side portions of each of the racks, while these sliding arms are provided with annular strings extended in the reciprocating direction of the sliding arms and engaging members reciprocable in the same direction with the sliding arms and driven to be engaged/disengaged with respect to the engaging portions on the side walls of the containers. The annular strings are fixed to a body of the picker on one extension line side of the annular strings while being coupled to the engaging members in a prescribed position on the other extension line side, so that the engaging members are reciprocally driven on the sliding arms in association with the reciprocal driving of the sliding arms.

Therefore, reciprocation strokes for the sliding arms can be reduced in operation for inserting/extracting the containers, while a single reciprocation driving source may be employed for both of the sliding arms and the engaging members, to simplify a reciprocation driving mechanism and a control system of the mechanism.

The above object and other objects and effects of the present invention will become more apparent from the following description made with reference to the accompanying drawings.

BRIEF DESCRIPTION OF THE DRAWINGS

FIG. 2 is a block diagram showing schematic structure of a light communication unit employed in the apparatus of FIG. 1.

FIG. 3 is an explanatory diagram showing an example of communication between a main computer and respective inner pickers.

FIG. 4 illustrates the format of signals employed for the communication.

FIG. 5 is an explanatory diagram showing another example of communication between the main computer and the respective inner pickers.

FIG. 6 is a flow chart showing container extracting operation of the apparatus shown in FIG. 1.

FIG. 7 is a flow chart showing operation of the apparatus shown in FIG. 1 prior to return operation in a free location system.

FIG. 8 is a flow chart showing container return operation of the apparatus shown in FIG. 1.

FIG. 9 is a plan view showing an operating mechanism of an inner picker.

FIG. 13 is a perspective view showing an engaging member.

FIG. 14 is a perspective view showing a container.

FIG. 15 is a block diagram showing a signal transfer system between an output mechanism and the main computer.

FIG. 19 is a schematic plan view showing an arbitrary rack stage of the device shown in FIG. 17.

FIG. 20 is an explanatory view showing operation of the charging/delivering device.

BEST MODES OF CARRYING OUT THE INVENTION

Figure 1:
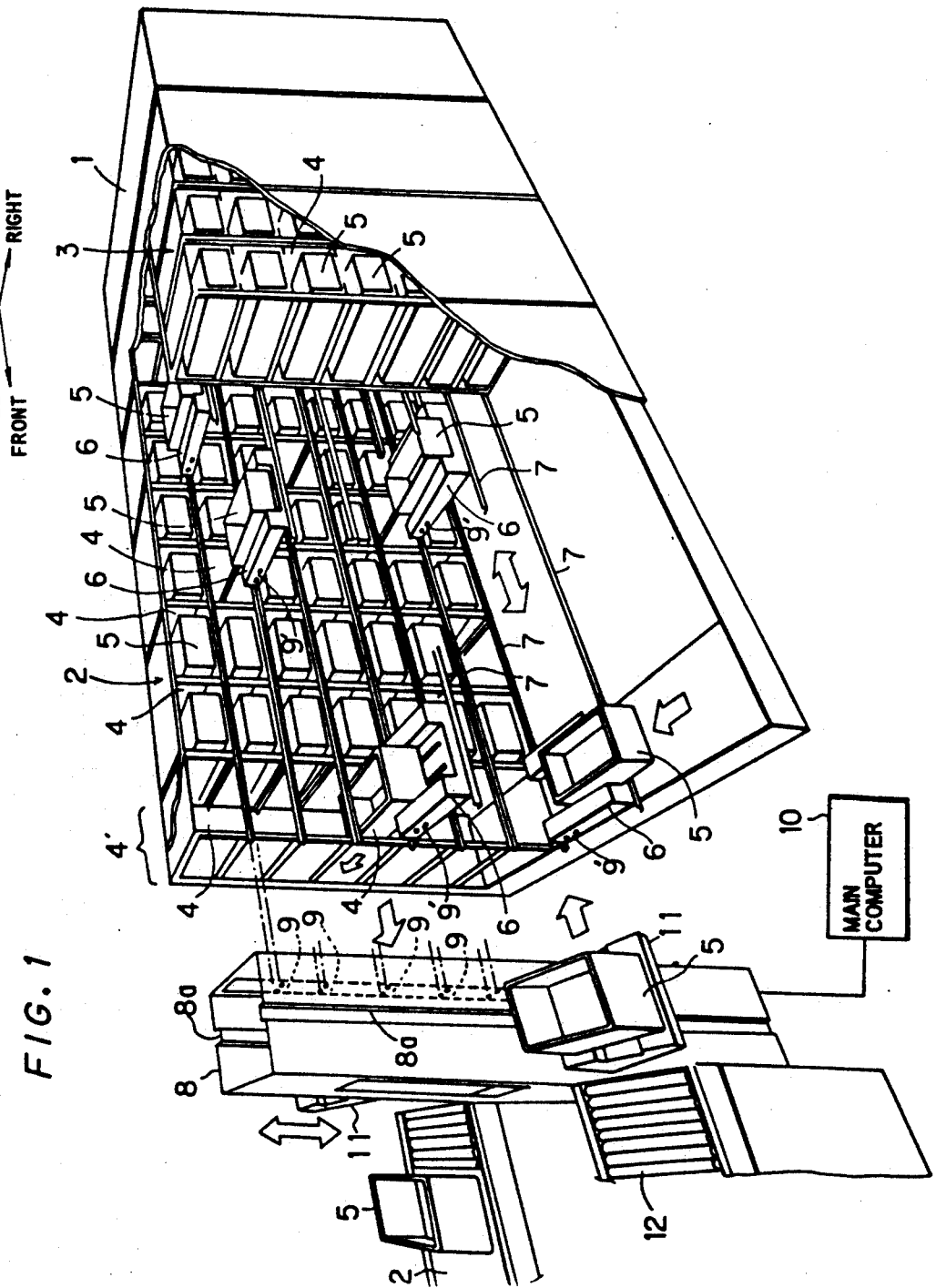
FIG. 1 is a perspective view showing an automatic storage/retrieval apparatus for articles according to an embodiment of the present invention.

FIG. 1 is a perspective view showing an automatic storage/retrieval apparatus for articles according to an embodiment of the present invention. This automatic storage/retrieval apparatus has storage areas 2 and 3 on right and left sides in a housing 1. Each of the storage areas 2 and 3 is formed by racks 4, serving as places for storing articles, which are vertically and horizontally arranged in the form of a matrix. The left and right storage areas 2 and 3 are so arranged that opening sides of the racks 4 face each other. Inner pickers 6 movable in the front-rear direction, for putting/taking containers 5 in/out with respect to the racks 4, are provided for each rack stage of the storage areas 2 and 3, in an intermediate area between the left and right storage areas 2 and 3. Namely, the left and right storage areas 2 and 3 are provided with a pair of rails 7, in a vertical position corresponding to each rack stage, parallely in the front-rear direction, and each of the inner pickers 6 is movably placed on the rails 7. This inner picker 6 is provided with an in-and-out mechanism formed by a general mechanism such as the aforementioned fork lift mechanism or extracting arm mechanism, or preferably by a sliding arm mechanism according to the present invention as hereinafter described, so that the containers 5 stored in the racks 4 of the left and right storage areas 2 and 3 can be taken in on the inner picker 6 or the containers 5 can be inserted in the racks 4 from the inner picker 6.

A column 8 stands in front of the housing 1, in opposition to a travel space for the inner pickers 6. Optical communication units 9 are provided in positions opposite to the inner pickers 6 of the respective rack stages on the rear surface side of the column 8, respectively, while optical communication units 9', which face the optical communication units 9 on the column 8, are provided on the inner pickers 6, respectively. The respective optical communication units 9 on the column 8 are connected to a main computer 10 which controls the entire automatic storage/retrieval apparatus, to control operations of the inner pickers 6 by transferring optical signals by the optical communication units 9 and 9' between the column 8 and the inner pickers 6. A power source for each inner picker 6 is obtained through a trolly duct (not shown) along each rail 7.

Further, outer pickers 11 are vertically movably provided on both side portions of the column 8 to be opposite to rack groups 4' (only the left rack group 4' is shown in FIG. 1) for charge/delivery which are positioned in the frontmost columns of the left and right storage areas 2 and 3 of the housing 1. The outer pickers 11 are engaged in guide grooves 8a vertically provided on the side surfaces of the columns 8, to be vertically driven through control by the aforementioned main computer 10. The outer pickers 11 are provided with in-and-out mechanisms which are similar to those of the inner pickers 6, to transfer the containers 5 carried to a side portion of the column 8 by external conveyors 12 to desired rack stages of the aforementioned charging/delivering rack groups 4' and insert the same in the racks 4 from sides of the charging/delivering rack groups 4', as well as to take out the containers 5 brought into the racks 4 of the charging/delivering rack groups 4' from other racks 4 by the inner pickers 6 and transfer the same onto the external conveyors 12.

FIG. 2 is a block diagram showing schematic structure of the aforementioned optical communication units 9 and 9' provided on the column 8 and the inner picker 6, respectively. The optical communication units 9 and 9' are provided with both a transmission system and a receiving system. The transmission system modulates an inputted electric signal $S_i$ in a predetermined mode by a modulation circuit 13 and thereafter converts the same into an optical signal by a drive circuit 14 including a light emitting element, to output the optical signal "a" through a filter 15. On the other hand, the receiving system receives an inputted optical signal "b" through an optical system 16 including a filter and a lens, photoelectrically converts the same into an electric signal by a drive circuit 17 including a light receiving element, passes the electric signal through a filter circuit 18 and thereafter amplifies the same by an amplifier 19, adjusts the same to a predetermined signal level by a receiving level unifying circuit 20 and demodulates the signal to an electric signal $S_O$ of a predetermined mode by a demodulation circuit 21. The mutual transmission systems and receiving systems are so opposed that an optical signal outputted from the transmission system of an optical communication unit 9 on the column 8 is inputted in the receiving system of the optical communication unit 9' of a corresponding inner picker 6 and an optical signal outputted from the transmission system of the optical communication unit 9' of an inner picker 6 is inputted in the receiving system of a corresponding optical communication unit 9 on the column 8. Bidirectional communication is performed between the aforementioned main computer 10 and the respective inner pickers 6 by a polling selecting system, as shown in FIG. 3.

As signals to be transmitted from the main computer 10 to each inner picker 6, this embodiment employs a data format formed by an address $D_1$ for designating the inner picker 6, a command $D_2$ such as extraction/return of the container 5, an address $D_3$ of the container 5 (or the rack 4) to be put in/taken out. Such signals may be transferred from the respective optical communication units 9 on the column 8 simultaneously to all of the inner pickers 6. Although each inner picker 6 receives not only a signal designated to itself but also signals designated to other inner pickers 6, each inner picker 6 selects only the signal designated to itself from these signals on the basis of the address $D_1$ to execute the command. Alternatively, each signal may be transmitted to only a corresponding inner picker 6, as shown in FIG. 5. Although a problem of interference to an adjacent inner picker 6 may conceivably occur as shown by a dotted line in FIG. 5, it can be solved by employing the aforementioned signal format shown in FIG. 4. When a problem of interference is also caused in the path of a signal generated from the inner picker 6, a signal format similar to the above may be employed, thereby to independently drive the inner pickers 6 in the respective rack stages.

The operation of this automatic storage/retrieval apparatus will now be described, with reference to flow charts shown in FIG. 6 to FIG. 8.

(1) Extraction of Container 5

Referring to the flow chart shown in FIG. 6, when extraction of a desired article from the storage area 2 or 3 is requested by an online manner from an external computer or by input by a floppy disk to the main computer 10, at a step $S_1$, the main computer 10 indexes the location address of a container 5 storing the article, i.e., the stage number and the column number of a rack 4 storing the container 5 from the item number of the desired article, at a step $S_2$. Then a command is transmitted to the inner picker 6 of the corresponding stage through the optical communication unit 9, at a step $S_3$. If a large number of articles are requested to be extracted and the numbers of stages of target racks corresponding thereto are different from each other, such commands are transmitted to the inner pickers 6 for the respective stages in parallel with each other, for example. The inner picker 6 receiving this command starts running toward the position of the target rack 4 at a step $S_4$. Before such starting of running, the inner picker 6 waits in a position where it completed the preceding operation in the corresponding stage. When the inner picker 6 reaches the target rack 4 to stop running at a step $S_5$, the in-and-out mechanism of the inner picker 6 operates to start extraction of the container 5 from the rack 4 at a subsequent step $S_6$. When the container 5 is taken in on the inner picker 6 to complete extraction at a step $S_7$, the inner picker 6 starts running toward a home position for delivery, i.e., the charging/delivering rack group 4' in the frontmost column, at a subsequent step $S_8$. When the inner picker 6 reaches the home position to complete running at a step $S_9$, the in-and-out mechanism of the inner picker 6 again operates so that the container 5 thus carried is inserted in the rack 4 of the charging/delivering rack group 4', at a subsequent step $S_{10}$. When insertion of the container 5 is completed at a step $S_{11}$, a signal indicating completion of the operation is transmitted from the inner picker 6 to the main computer 10 through the optical communication units 9 and 9' at a subsequent step $S_{12}$, and the inner picker 6 waits there until a subsequent command is received.

The container 5 inserted in the rack 4 of the charging/delivering rack group 4' is taken out by the outer picker 11 operating asynchronously with movement of the inner picker 6 and placed on the external conveyor 12 to be carried toward the exterior.

(2) Return of Container 5

A container 5 carried by the external conveyor 12 is first placed on the outer picker 11, to be inserted in the rack 4 of the charging/delivering rack group 4' of the frontmost column. When the system of returning the container 5 in the rack 4 of the storage area 2 or 3 is a fixed location system, i.e., a system of returning the container 5 to the rack 4 of a designated position in this operation, the container 5 is inserted in the rack 4 of a designated stage number within the racks 4 of the charging/delivering rack group 4'.

In a free location system of not specifying the rack 4 for returning the container 5 but specifying an empty rack 4 to which the container 5 can be returned in the shortest time every time, on the other hand, the container 5 is placed onto the charging/delivering rack group 4' in accordance with the flow chart shown in FIG. 7. Referring to FIG. 7, the container 5 is moved on the outer picker 11 from the external conveyor 12, at a step $S_{21}$. Then the standby position of an inner picker 6 of waiting state after completion of its operation is checked at a step $S_{22}$, and positions of empty racks 4 in the storage areas 2 and 3 are confirmed at a step $S_{23}$. Then, based on the data of the aforementioned standby position and the positions of the empty racks 4, determined is a stage having the shortest distance required when the inner picker 6 goes for the container 5 to the charging/delivering rack group 4' from the current standby position and transfers the same to the empty rack 4, at a subsequent step $S_{24}$. On the basis of this determination, the container 5 is inserted in the rack 4 of the corresponding stage of the charging/delivering rack group 4' from the outer picker 11, at a subsequent step $S_{25}$.

Operation for returning the container 5 placed on the rack 4 of the charging/delivering rack group 4' to the empty rack 4 of the storage area 2 or 3 is performed in accordance with the flow chart shown in FIG. 8. Referring to FIG. 8, when return of the container 5 is requested at a step $S_{31}$, checking is made as to whether or not the container 5 is in the rack 4 of the charging/delivering rack group 4'. When presence of the container 5 is confirmed, the location address of a rack 4 for storing the container 5 is determined at a subsequent step $S_{32}$. Then, a return command is transmitted to the inner picker 6 of the corresponding stage through the optical communication units 9 and 9', at a step $S_{33}$. The corresponding inner picker 6 receiving this command starts running toward the charging/delivering rack group 4', at a step $S_{34}$. When the inner picker 6 reaches the charging/delivering rack group 4' to stop, at a step $S_{35}$, the in-and-out mechanism of the inner picker 6 operates so that the container 5 is taken in on the inner picker 6 from the rack 4 of the charging/delivering rack group 4', at a subsequent step $S_{36}$. When the container 5 is completely taken in on the inner picker 6, at a step $S_{37}$, the inner picker 6 starts running toward a target rack 4 at a subsequent step $S_{38}$. When the inner picker 6 reaches the target rack 4 to complete running, at a step $S_{39}$, the in-and-out mechanism of the inner picker 6 again operates so that the container 5 thus carried is inserted in the rack 4, at a subsequent step $S_{40}$. When insertion of the container 5 is completed at a step $S_{41}$, a signal indicating completion of the operation is transmitted from the inner picker 6 to the main computer 10 through the optical communication units 9 and 9' at a subsequent step $S_{42}$, and the inner picker 6 waits there until a subsequent command is received. Thus, the inner picker 6 receives the subsequent command at the waiting position without going back to its home position after returning operation, whereby the access time is reduced.

According to the automatic storage/retrieval apparatus for articles of the aforementioned embodiment, insertion/extraction of articles with respect to respective racks of the storage areas is performed by simply driving the inner pickers. Therefore, power required for operation can be greatly reduced as compared with the prior art system in which the picker is moved with the column. Further, the rack structure of the storage areas is simplified, and hence extension and transfer of the storage areas can be easily performed, and it becomes possible to take close layout to effectively use a limited space. Further, the inner pickers are provided for the respective stages of the storage areas to be independently driven respectively, whereby a plurality of articles can be simultaneously inserted/extracted to remarkably improve efficiency. In addition, signals are transferred between the respective inner pickers and the control device through optical communication to control the inner pickers, whereby wiring processing in installation of the apparatus can be extremely simplified.

Figure 10:
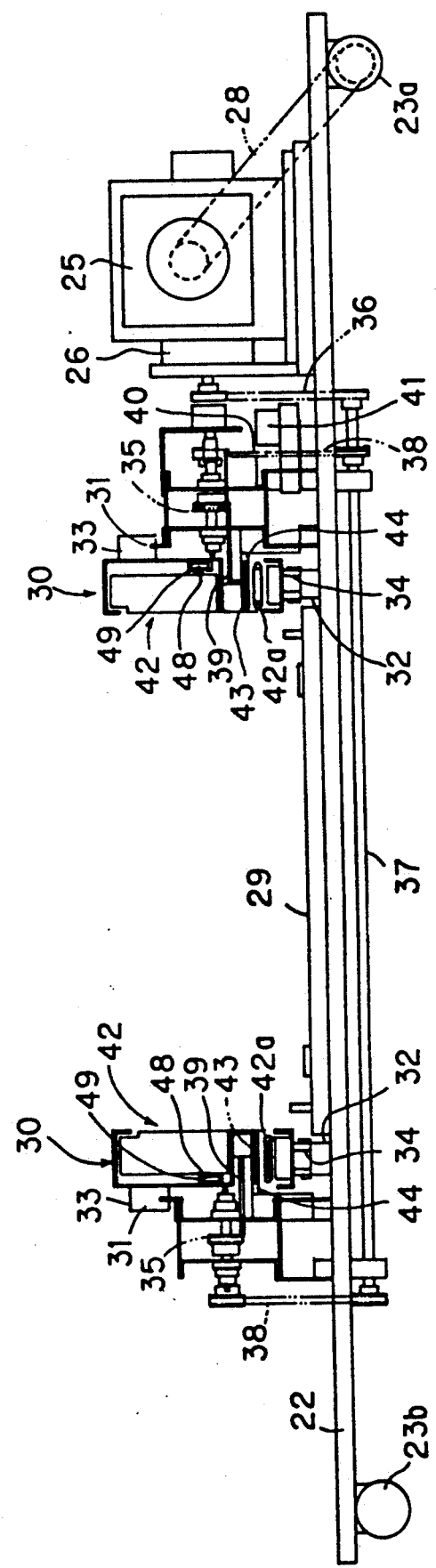
FIG. 10 is a side elevational view showing the operating mechanism of the inner picker.
Figure 11:
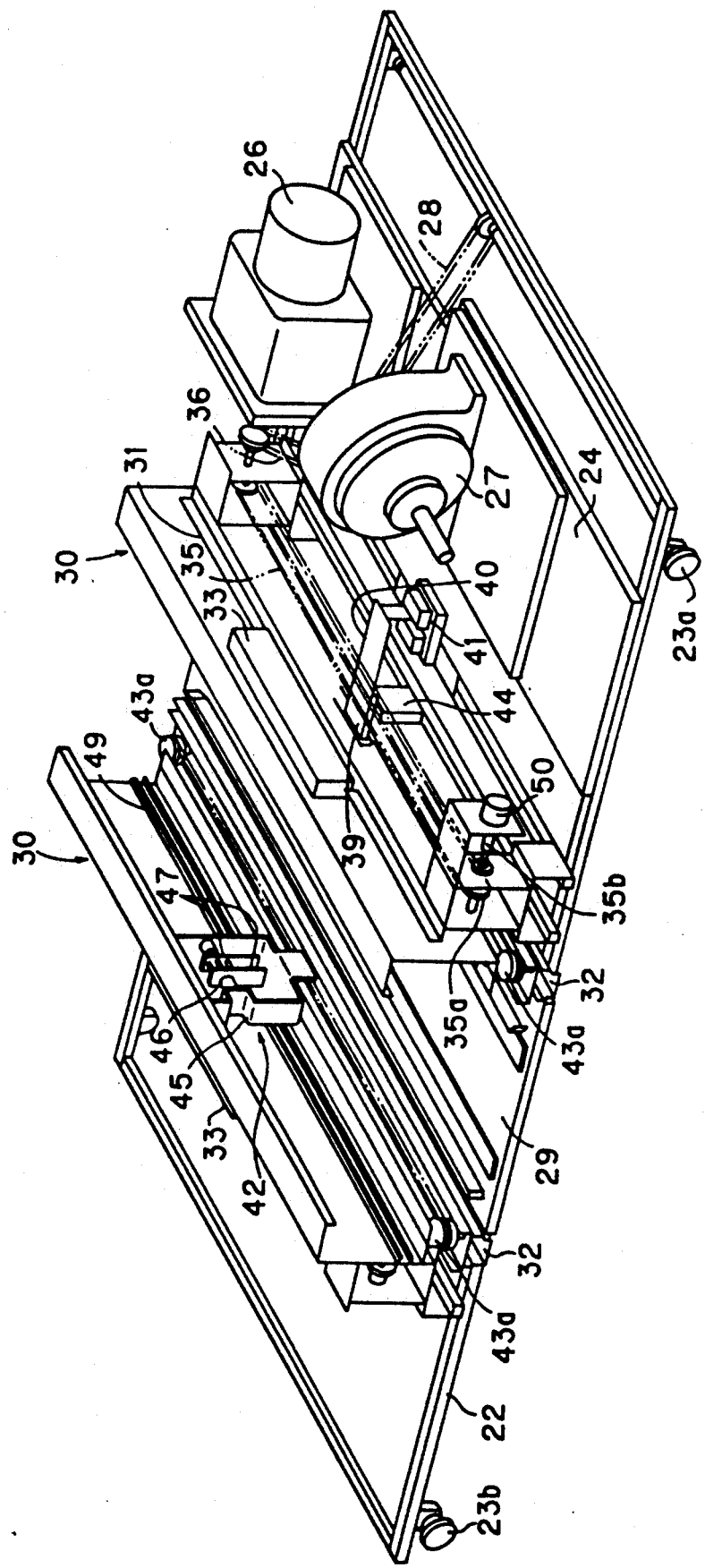
FIG. 11 is a perspective view showing the operating mechanism of the inner picker.
Figure 12:
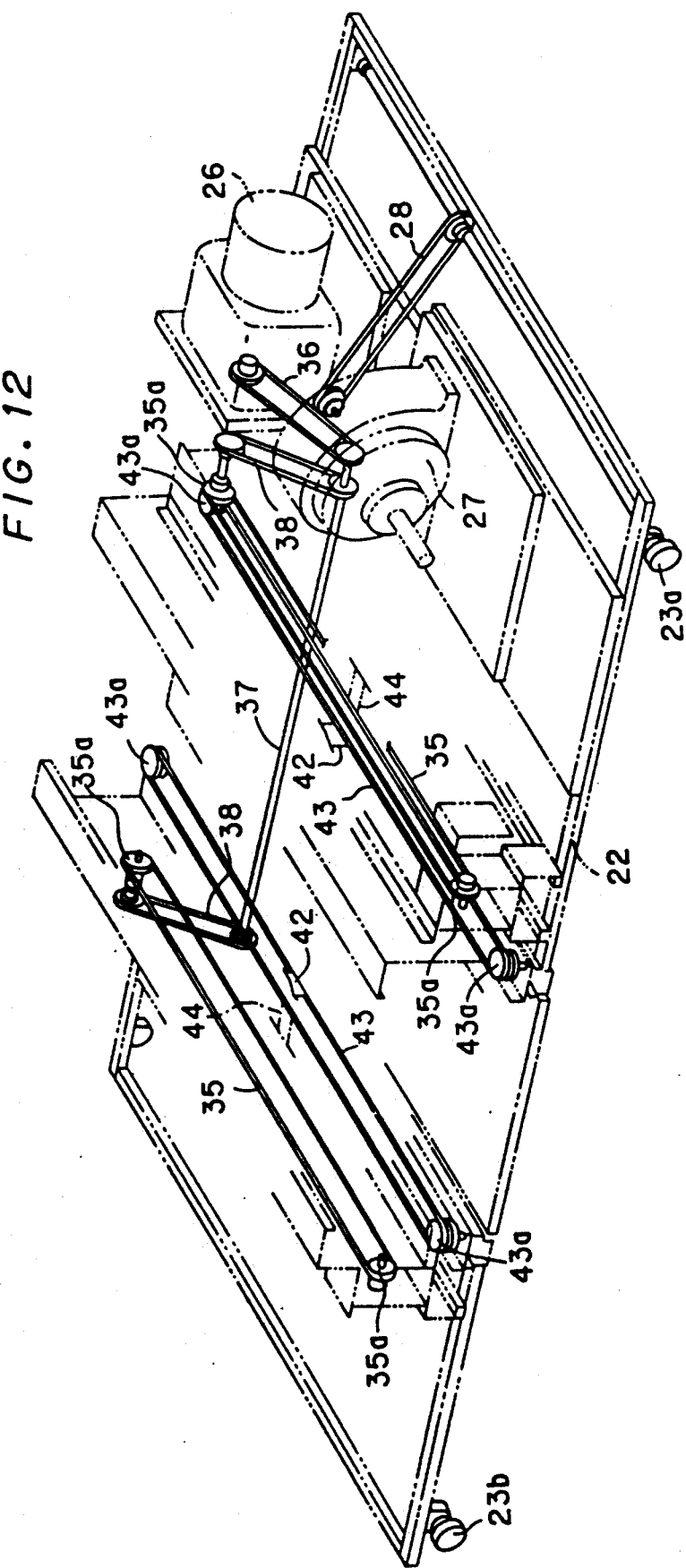
FIG. 12 is a perspective view showing a power transmission system for the operating mechanism of the inner picker.

FIG. 9 and FIG. 10 are a plan view and a front elevational view showing preferred structure of the in-and-out mechanism in each of the aforementioned inner pickers 6, respectively. FIG. 11 and FIG. 12 are a perspective view showing the entire structure of each in-and-out mechanism and a perspective view showing a driving transfer system, respectively. Referring to FIG. 9 to FIG. 12, numeral 22 indicates a frame forming a bottom portion of the body of the inner picker 6, and wheels 23a and 23b for horizontally moving the inner picker 6 are provided on front and rear parts of the frame 22, respectively. A travel motor 25 and an extraction motor 26, which are a driving source for the in-and-out mechanism, are set on a block 24 extended on the front part of the frame 22. Rotational output of the travel motor 25 is decelerated by a decelerator 27 separately provided on the block 24 and thereafter transmitted to the wheel 23a of the front part through a chain 28.

A block 29 for receiving the container 5 is extended in the central portion of the frame 22. A pair of sliding arms 30 are arranged on both side portions of the block 29, toward both side portions of the rack 4 of the aforementioned storage areas 2 and 3. Guide rails 31 and 32 are provided on the frame 22 along the outer side surfaces and the bottom surfaces of the sliding arms 30, respectively. Engaging portions 33 provided on the outer side surfaces of upper half portions of the sliding arms 30 are engaged with the guide rails 31, while rollers 34 provided on the bottom surfaces of the sliding arms 30 are fitted on the guide rails 32, so that the sliding arms 30 are reciprocable toward the rack 4. Endless chains 35, which are parallel to the sliding arms 30, are extended under the respective guide rails 31. Rotational output of the extraction motor 26 is transmitted to the respective endless chains 35 through a chain 36, a transmission shaft 37 and a chain 38, as shown in FIG. 12. Central positions of the respective sliding arms 30 are coupled to the corresponding endless chains 35 through coupling members 39, so that the left and right sliding arms 30 synchronously reciprocate following synchronous driving of both endless chains 35.

In the right endless chain 35, a sensor dog 40 is extended from the coupling portion of the coupling member 39, while a center sensor 41 formed by a photocoupler and the like for detecting the sensor dog 40 is provided in a central position on the frame 22. The center sensor 41 detects the sensor dog 40, to confirm that the sliding arms 30 are in center positions, i.e., the sliding arms 30 are in initial positions within the range of the frame 22.

Further, engaging members 42 to be engaged/disengaged with/from the side wall of the container 5 are provided on the upper half portions of the sliding arms 30, while second endless chains 43 are extended in the lower half portions of the sliding arms 30 along longitudinal directions thereof. Each of the engaging members 42 is coupled to one extension line of each of the endless chains 43 while another extension line of the endless chain 43 is fixed to a central position of the frame 22 in the sliding arm reciprocating direction through a coupling member 44, whereby the endless chain 43 is displaced in rotational position between sprockets 43a provided on both end portions of each sliding arm 30, so that the engaging member 42 reciprocates on the sliding arm 30, in association with reciprocation of the sliding arm 30. A position for coupling the engaging member 42 to the endless chain 43 is so set that the engaging member 42 is exactly located in a central position when the sliding arm 30 is in the initial position (central position).

Each engaging member 42 is formed by mounting picking arms 47, which is rotated by a solenoid 46, in a case 45, as shown in FIG. 13. A guide roller 48 provided on the back surface of the case 45 is fitted with a guide rail 49 provided in the sliding arm 30, so that each engaging member 42 is reciprocable along the sliding arm 30, as shown in FIG. 10.

A rotary encoder 50 is provided on a shaft 35b of one of the sprockets 35a of one of the endless chains 35 for reciprocally moving the sliding arms 30, to thereby detect the reciprocal position of the sliding arm 30, i.e., the engaging member 42.

FIG. 14 is a perspective view showing exemplary structure of a container 5. The container 5 is provided with ribs 5a vertically and horizontally on its outer side surfaces, so that a vertical rib $5a_1$ on a front side is employed as an engaging portion to be engaged with the picking arm 47 of the engaging members 42.

FIG. 15 is a block diagram showing a system for transferring signals between the aforementioned main computer 10 and each inner picker 6. A travel command signal outputted from the main computer 10 is supplied to the travel motor 25 through a motor driver 51, while a detection signal of a travel position sensor 52 provided on the innner picker 6 is transmitted to the main computer 10. An in-and-out mechanism driving command signal outputted from the main computer 10 is supplied to the extraction motor 26 through the motor driver 53, while a detection signal detected by the center sensor 41 of the inner picker 6 is transmitted to the main computer 10. The amount of movement of the sliding arms (and the engaging member 42) detected by the rotary encoder 50 is counted by a conter circuit 54, and its count value is inputted in the main computer 10. Engagement/disengagement driving command signals for the engaging members 42 outputted from the main computer 10 are inputted in the solenoids 46 of the left and right engaging members 42 through a solenoid driver 55.

In the inner picker 6, feeder lines 42a (see FIG. 10) for feeding the solenoids 46 are annularly wired along the endless chains 43 for reciprocally moving the engaging member 42. The feeder lines 42a are fed from the side of frame 22 at the positions of the coupling members 44 for fixing the endless chains 43 to the frame 22, so that no sagging or tension acts on the feeder line 42a when the engaging members 42 reciprocate with reciprocation of the sliding arms 30.

Figure 16A:
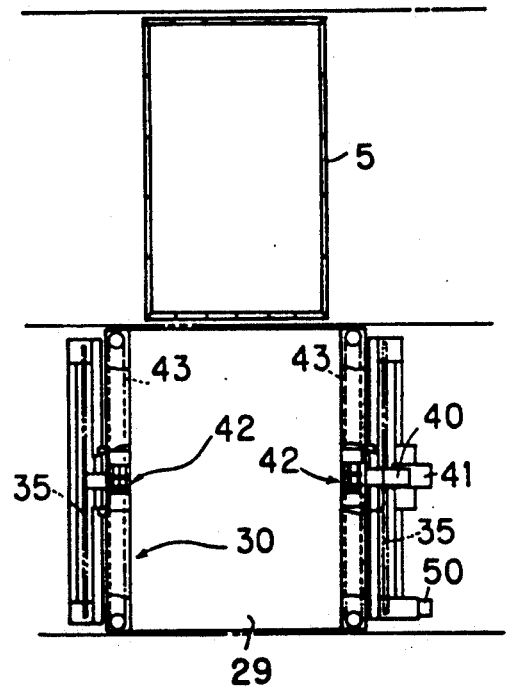
FIG. 16 is an explanatory diagram showing container extracting operation of an in-and-out mechanism of the inner picker.

Operation for extracting the container 5 from the rack 4 by the aforementioned in-and-out mechanism of the sliding arm system is performed in the following sequence: First, when the endless chains 35 operate in a predetermined direction by starting of the extraction motor 26, after the initial state in which the sliding arms 30 are contained in the body of the inner picker 6 as shown in FIG. 16A, the sliding arms 30 coupled to the endless chains 35 are advanced toward both side portions of the rack 4. Following such operation, the sprockets 43a provided with respect to other endless chains 43 on the sliding arms 30 are advanced with the sliding arms 30, whereby the endless chains 43 coupled to the body of the inner picker 6 are displaced in rotational position and the engaging members 42 coupled with the endless chains 43 are responsively advanced on the sliding arms 30 in amounts of advancing identical to those of the sliding arms 30. When the sliding arms 30 are moved by a distance l with respect to the body of the inner picker 6, the engaging members 42 are moved by a distance 2l with respect to the body of the inner picker 6.

Figure 16B:
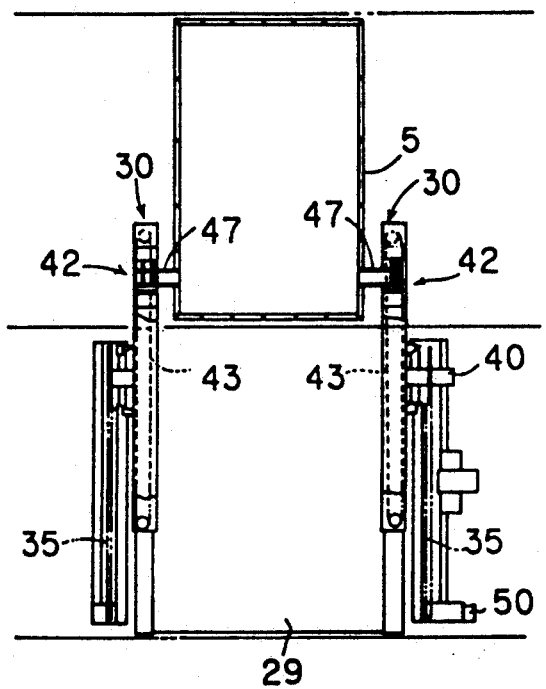

The amounts of advancing of the engaging members 42 are detected by the rotary encoder 50, so that the advancing operation is stopped on the basis of the detection signal when the engaging members 42 reach positions slightly passing over the corresponding vertical rib $5a_1$, which is a engaging portion of the outer side surface of the container 5, as shown in FIG. 16B. In such advancing operation, feeder lines connected to the solenoids 46 of the engaging members 42 from the body side of the inner picker 6 are not subjected to sagging or excessive tension, since the same are wired along the endless chains 43.

Then the solenoids 46 are fed so that the picking arms 47 of each engaging member 42 are horizontally raised, as shown by phantom lines in FIG. 13. Under this state, the extraction motor 26 is started reversely to the above case, whereby the sliding arms 30 and the engaging members 42 are retracted toward the body side of the inner picker 6. Through such operation, the picking arms 47 of the fitting members 42 are fitted with the vertical rib $5a_1$ of the container 5, so that the container 5 is moved along with the engaging members 42 onto the block 29 of the inner picker 6 from the rack 4.

Figure 16C:
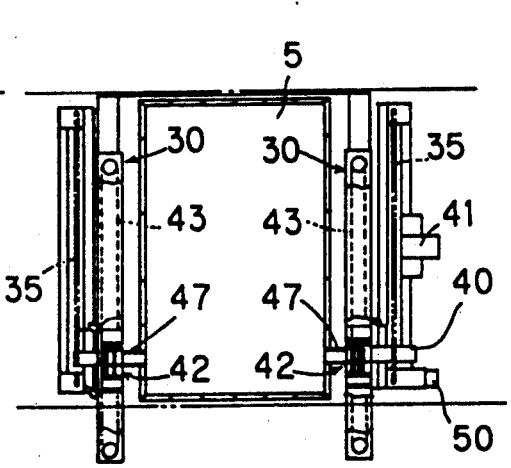
Figure 16D:
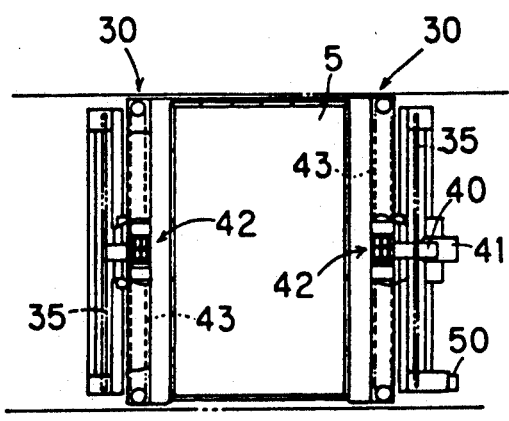

When the sliding arms 30 and the engaging members 42 are retracted until the container 5 is completely placed on the block 29 (confirmation thereof is performed on the basis of a detection signal from the rotary encoder 50), as shown in FIG. 16C, feeding to the solenoids 46 is stopped to release engagement of the picking arms 47 with the container 5, and thereafter the sliding arms 30 and the engaging members 42 are returned to the initial positions, as shown in FIG. 16D.

On the other hand, operation for inserting the container 5 in the rack 4 by the in-and-out mechanism of the sliding arm system is performed by reversely following the operation shown in FIG. 16.

According to the aforementioned in-and-out mechanism for the inner picker 6, the annular strings extended on each sliding arm are fixed to the picker body on one extension line side thereof while the other extension line sides of the endless annular strings are coupled to the fitting member, so that the engaging members reciprocate on the sliding arms toward the reciprocation direction of the sliding arms following reciprocation of the sliding arms. Thus, sliding arms engageable/disegageable with/from a general container on side portions of the container can be implemented in simple structure, and it becomes possible not only to suppress reciprocation strokes of the sliding arms in in-and-out operation for the container but-also to employ only one reciprocation driving source for both of the sliding arms and the engaging members. Further, transfer mechanisms for transferring reciprocation driving force to the engaging members and control systems of the transfer mechanism are extremely simplified, and hence the cost can be reduced and a wide carrying space can be ensured in the picker.

Figure 17:
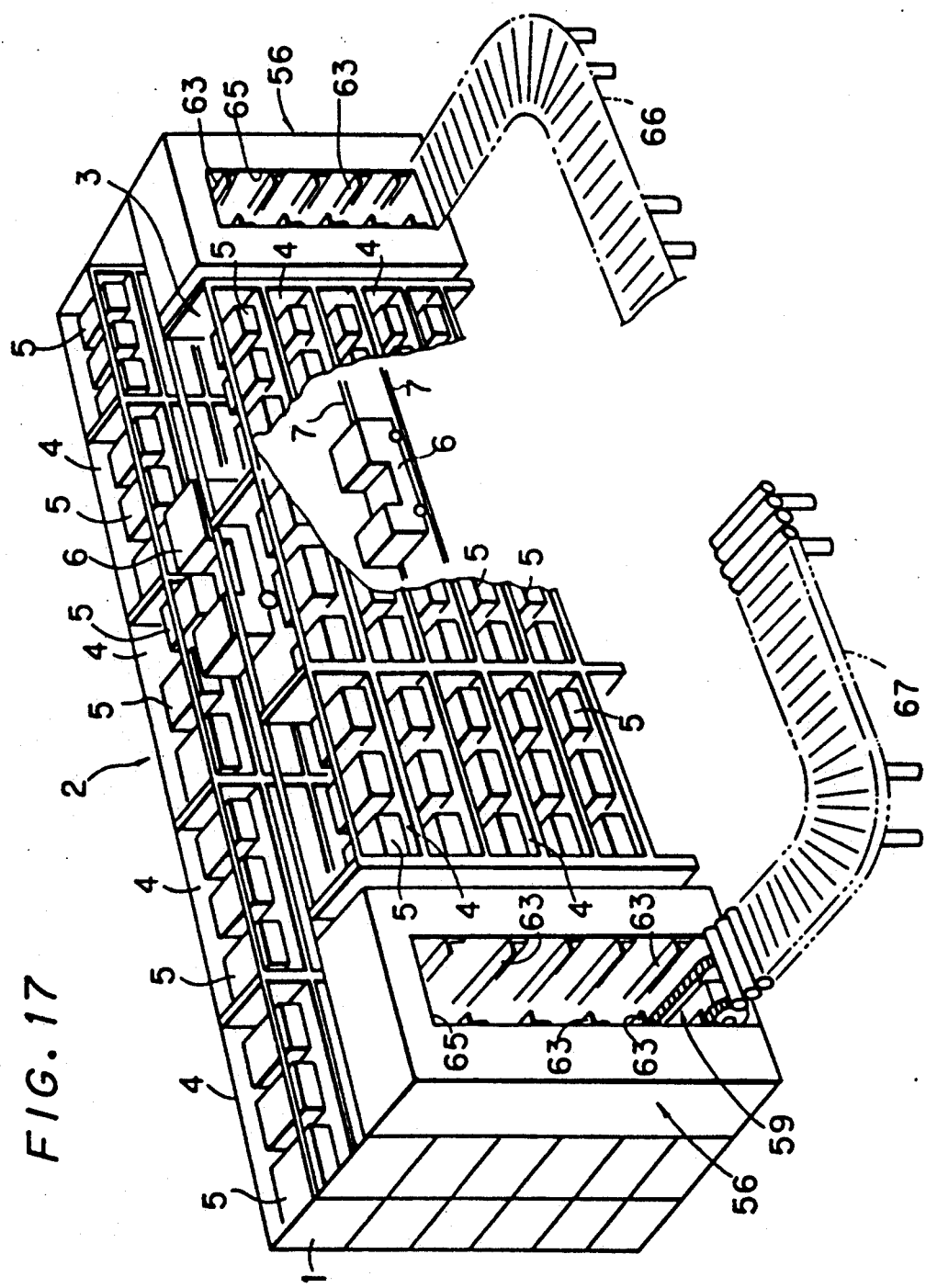
FIG. 17 is a perspective view showing an automatic storage/retrieval apparatus according to another embodiment of the present invention.
Figure 18:
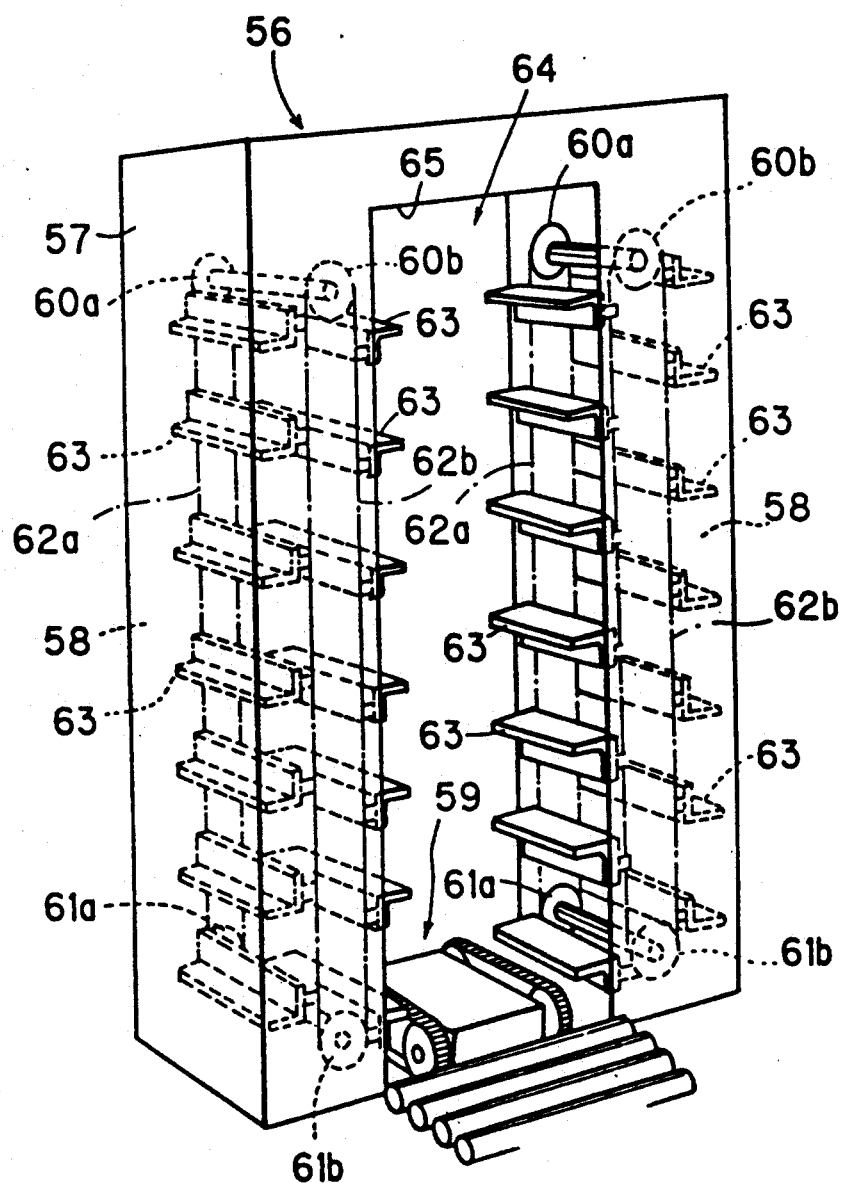
FIG. 18 is a perspective view showing a charging/delivering device.

FIG. 17 is a perspective view showing another embodiment of an automatic storage/retrieval apparatus for articles according to the present invention. In this embodiment, charging/delivering devices 56 for carrying containers 5 in and out with respect to respective rack stages are provided on both end portions of a right storage area 3 in place of racks 4, respectively. As shown in perspective view of FIG. 18, each of these charging/delivering devices 56 has a pair of endless chain mechanisms 58 oppositely provided in the left and right sides of a housing 57 and a conveyor belt 59 provided in the lowermost position between the endless chain mechanisms 58. Each of the left and right endless chain mechanisms 58 is formed by extending a front and rear pair of chains 62a and 62b between front and rear pairs of upper sprockets 60a and 60b and lower sprockets 61a and 61b, respectively, while a plurality of horizontal support plates 63 are horizontally extendedly fixed between the front and rear pair of chains 62a and 62b at regular intervals in accordance with vertical spaces between the racks 4. The left and right endless chain mechanisms 58 are synchronously driven by the same driving source (not shown) so that the horizontal support plates 63 are vertically circulated in a manner such that they are opposed to each other in the same vertical positions, to form a container elevation mechanism 64 for elevationally moving the containers 5 while placing the containers 5 between the left and right horizontal support plates 63. Longitudinal gates 65 having width capable of passing the containers 5 and height corresponding to the uppermost positions of the racks 4 are provided in front and at the back of the housings 57, such that the gates 65 directed toward travel paths for pickers 6 are trued up with opening positions of the racks 4 on the same storage area 3.

The belt conveyor 59 is formed to be bidirectionally rotatable by a driving source (not shown), to form a container in-and-out mechanism for carrying out the containers 5 lowered while being placed between the left and right horizontal support plates 63 of each charging/delivering device 56 to the exterior and placing the containers 5 fed from the exterior between the horizontal support plates 63.

Operation of the automatic storage/retrieval apparatus for articles according to this embodiment will now be described with reference to FIG. 19 and FIG. 20. FIG. 19 is a schematic plan view in an arbitrary rack stage of this automatic storage/retrieval apparatus. Referring to FIG. 19, when a picker 6 for this rack stage is commanded to extract a container 5 from a desired rack 4, the picker 6 horizontally runs along rails 7 to the designated rack position to stop there, whereafter an in-and-out mechanism installed in the picker 6 operates so that the container 5 is extracted from the rack 4 to be taken in on the picker 6. When the taking-in operation is completed, the picker 6 horizontally runs to the charging/delivering device 56 on the rear end portion, which is designated as that dedicated to carrying-out, for example, to stop in front of the gate 65 of this charging/delivering device 56. The aforementioned operation of the picker 6 is independently performed for each rack stage.

In the charging/delivering device 56 dedicated to carrying-out, on the other hand, the container elevation mechanism 64 stops in a position where each horizontal support plate 63 is trued up with the height of each rack stage, so that the container 5 is moved onto corresponding horizontal support plates 63 from the picker 6. Such operation may be simultaneously performed with respect to pickers 6 for the respective rack stages.

FIG. 20 is an explanatory view showing operation through which a container 5 is moved on the belt conveyor 59, which is a container in-and-out mechanism, from the container elevation mechanism 64. When the container elevation mechanism 64 is further lowered from a state in which the container 5 is placed on the horizontal support plates 63 as shown in FIG. 20A, the container 5 is placed onto the belt conveyor 59 since the horizontal support plates 63 are lowered to positions lower than a receiving plane of the belt conveyor 59 as shown in FIG. 20B. The belt conveyor 59 is rotatingly driven toward a discharge side in synchronization with an external carrying conveyor 66, whereby the container 5 is carried out onto the external carrying conveyor 66 through the gate 65 at the rear part of the charging/delivering device 56, as shown in FIG. 20C.

On the other hand, in the charging/delivering device 56 on the front end portion, designated as that dedicated to carrying-in, the operation is reverse to that of the aforementioned charging/delivering device 56 dedicated to carrying-out. Namely, the horizontal support plates 63 of the container elevation mechanism 64 are raised up and the belt conveyor 59, which is the container in-and-out mechanism, is rotatingly driven in synchronization with an external carrying conveyor 67 to take the container 5 from the external carrying conveyor 67 into the charging/delivering device 56, to thereby carry the containers 5, brought in from the exterior, sequentially to the respective rack stages. The picker 6 for each rack stage receiving a command for storing the container 5 stops in front of the gate 65 of the charging/delivering device 56 dedicated to carrying-in, to take out the target container 5 from the horizontal support plates 63 and carry the same to the designated rack 4.

Although two charging/delivering devices 56 dedicated to carrying-in and dedicated to carrying-out are used in the above embodiment, a single charging/delivering device 56 may serve both as that for carrying-in and that for carrying-out, as a matter of course.

According to the automatic storage/retrieval apparatus for articles in accordance with this embodiment as hereinabove described, in-and-out operation/transferring of containers between the racks and the charging-/delivering device can be performed by the pickers independently operating for the respective rack stages, while carrying-in or carrying-out of the containers can be parallely performed between the pickers for respective rack stages and the charging/delivering device and between the exterior and the charging/delivering device, whereby efficiency is extremely improved and the operation cost can be reduced, while the structure is simplified.

Although the present invention has been described in detail with reference to embodiments shown in the drawings, the present invention is not to be restricted to the aforementioned embodiments. The scope of the present invention is to be defined only by the following claims.

We claim:

1. An automatic storage/retrieval apparatus for articles, comprising:
   a storage area provided with a plurality of racks, each rack comprising a plurality of vertically arranged rack stages, only a single vertical row of rack stages within said plurality of racks being designated as a charging/delivery rack group;
   a plurality of pickers to be horizontally movable only at a single level provided along opening sides of the racks for access to respective rack stages of said storage area to insert/extract articles into/from said stages from/to said charging/delivery rack group;
   a plurality of first optical communication units provided to respectively face the pickers;
   second optical communication units provided on respective ones of said pickers to perform optical communication with corresponding ones of said first optical communication units;
   picker control means for performing transfer of optical signals between said first and second optical communication units to independently control said pickers; and
   stationary transferring means operating independently of the operation of said pickers to transfer articles to an exterior, wherein said charging/delivery rack group constitutes said stationary transferring means.

2. An automatic storage/retrieval apparatus for articles in accordance with claim 1, wherein:
   each of said first and second optical communication units includes a transmission system and a receiving system,
   each said transmission system includes a modulation circuit for modulating an inputted electric signal in a predetermined mode and a light emitting element for converting said modulated electric signal into an optical signal, each said receiving system includes a light receiving element for converting an inputted optical signal into an electric signal and a demodulation circuit for demodulating said converted electric signal in a predetermined mode, and said optical signal outputted from said transmission system of said first optical communication unit is inputted in said receiving system of a corresponding one of said second optical communication units and said optical signal outputted from said transmission system of said second optical communication unit is inputted to said receiving system of a corresponding one of said first optical communication units.

3. An automatic storage/retrieval apparatus for articles in accordance with claim 2, wherein:

said optical signal from said first optical communication unit has a data format at least including information designating a specific one of said pickers, and said pickers are independently driven with respect to said respective rack stages.

4. An automatic storage/retrieval apparatus in accordance with claim 1, wherein:

said picker control means controls said pickers to wait in positions where operation of said pickers is completed.

5. An automatic storage/retrieval apparatus for articles in accordance with claim 1, further comprising:

a charging/delivering device provided in lateral arrangement with respect to said storage area, wherein said charging/delivering device includes an elevation mechanism having annular strings laterally oppositely provided in said charging/delivering device to be synchronously rotated in the vertical direction and support plates for carrying said articles, said support plates being fixed to said annular strings at regular intervals in accordance with vertical spaces between said racks, and an in-and-out mechanism provided in a lowermost portion of said elevation mechanism to be reciprocally moved in a depthwise direction of said racks, to thereby carry said articles from said support plates to an exterior or from the exterior to said support plates.

* * * * *